June 23, 1964     W. S. LEVIN     3,138,767
TRIANGULAR WAVE GENERATOR
Filed Jan. 22, 1962
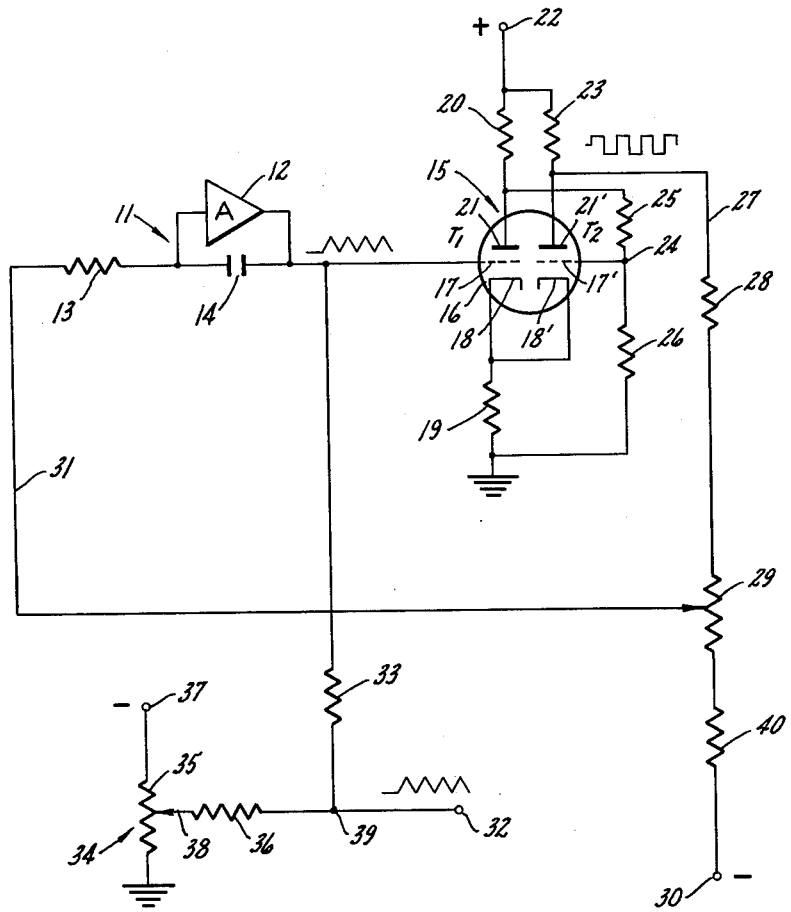
INVENTOR.
William S. Levin,
BY
Attorneys.

United States Patent Office 3,138,767
Patented June 23, 1964

3,138,767
TRIANGULAR WAVE GENERATOR
William S. Levin, Hyattsville, Md., assignor, by mesne assignments, to the United States of America as represented by the Secretary of the Navy
Filed Jan. 22, 1962, Ser. No. 167,985
3 Claims. (Cl. 331—144)

The present invention relates to a signal generator and more particularly to a generator for producing a signal having triangular waveforms.

Sweep-voltage generating circuits are commonly used in television and radar systems, and frequently it is necessary that the signal generated be a triangular wave, symmetrical with respect to zero. One commonly used method of generating a signal having a triangular wave comprises first generating a sawtooth waveform and then applying this waveform to a balanced amplifier to reproduce in a pair of voltages of similar amplitudes the original sawtooth waveform and a waveform of opposite slope. This pair of waveforms of opposite slope are then combined in an amplitude comparator which provides an output voltage having a triangular waveform composed of symmetrical portions of the positive-going and negative-going sawtooth voltages. While this method of utilizing sawtooth voltages provides a satisfactory triangular waveform, a multiple number of components are needed and the circuit is relatively expensive to produce.

The present invention provides a novel triangular wave generator that utilizes a minimum number of parts and yet can produce a waveform that is symmetrical and controllable in amplitude. The circuit of the present invention is comprised of an operational integrator and a square wave generator, such as a Schmitt trigger, that are connected in closed loop fashion.

It is therefore a general object of the present invention to provide an improved generator for producing a signal having a triangular waveform.

Another object of the present invention is to provide a new and improved generator having a minimum number of parts for producing a sweep voltage of triangular waveform.

Still another object of the present invention is to provide a generator of triangular waves having symmetrical slopes as the voltage increases and decreases in amplitude.

Other objects and advantages of the present invention will be readily appreciated as the same becomes better understood by reference to the following detailed description when considered in connection with the accompanying drawing which is a schematic circuit of an embodiment of the present invention.

Referring now to the drawing, there is shown an operational integrator 11, which by way of example is comprised of amplifier 12, resistor 13, and capacitor 14. Resistor 13 and capacitor 14 are connected in series and amplifier 11 is shunted across capacitor 14, as shown. An output of integrator 11 is provided as the input to a square wave generator 15, and the output of generator 15, in turn, is fed back as an input to integrator 11. The output of the integrator 11 is the negative integral of the input and thus it can be seen that a positive step input which is fed back from generator 15 will produce a negative going ramp function, and likewise, a negative step input will produce a positive going ramp function.

The square wave generator 15, as shown in the drawing, is a Schmitt trigger, which by way of example, comprises a twin triode 16. The grid 17 of section $T_1$ of triode 16 is connected to the output of integrator 11, and both cathodes 18 and 18' are connected through resistor 19 to ground. Anode 21 is connected through resistor 20 to a source of positive potential 22, and anode 21' of section $T_2$ is connected through resistor 23 to the source of positive potential 22. Grid 17' of section $T_2$ is connected to junction point 24 which is connected to anode 21 through resistor 25 and to ground through resistor 26. The output of the Schmitt trigger is fed back through lead 27, resistor 28, potentiometer 29 and lead 31 to the input of the integrator 11.

Potentiometer 29, which has one end connected to resistor 28 and the other end connected through resistor 40 to a source of negative potential 30, is provided in order to adjust the shape of the square wave applied to the integrator input so that the wave will be symmetrical in amplitude around zero.

An output of the integrator 11 is connected to output terminal 32 through resistor 33, and control unit 34, which is comprised of potentiometer 35 and resistor 36, is provided to insure that the output current is symmetrical around zero. As shown, potentiometer 35 has one end connected to a source of negative potential 37 and the other end connected to ground, with the arm 38 of potentiometer 35 being connected to junction point 39.

By way of example, the following table shows the values of various components that can be assembled to provide an operable circuit of the present invention:

| Name and No.: | Type or value |
|---|---|
| Resistor 13 | 3.3 megohms. |
| Capacitor 14 | 1 microfarad. |
| Tube 16 | Twin-triode 6111. |
| Resistor 19 | 10K ohms. |
| Resistor 20 | 18K ohms. |
| Voltage 22 | +250 volts. |
| Resistor 23 | 15K ohms. |
| Resistor 25 | 510K ohms. |
| Resistor 26 | 240K ohms. |
| Resistor 28 | 82K ohms. |
| Potentiometer 29 | 0–25K ohms. |
| Voltage 30 | −250 volts. |
| Resistor 33 | 130K ohms. |
| Potentiometer 35 | 0–50K ohms. |
| Resistor 36 | 330K ohms. |
| Voltage 37 | −250 volts. |
| Resistor 40 | 130K ohms. |

In operation, assuming that section $T_1$ of twin triode 16 is conducting, and section $T_2$ is off, a positive half of a square wave is being generated, and when fed back into the integrator 11, the output of the integrator 11 is a negative going ramp function. As the ramp function applied to section $T_1$ increases negatively, the voltage of plate 21 is raised to the point of initial conduction of section $T_2$ of triode 16. A slight conduction through section $T_2$ causes the cathode 18 of section $T_1$ to become more positive, which in turn makes plate 21 more positive. This action results in a regenerative turn-on of section $T_2$ with an accompanying rapid drop of the plate voltage of anode 21'. This negative going step function, when applied to integrator 11 produces an output which is a positive going ramp function. This positive going ramp function turns on section $T_1$, and turns off section $T_2$, when the voltage is increased sufficiently. It can thus be seen that one complete cycle has now been made and that the output of the integrator 11, which is applied to output terminal 32, is a triangular wave.

Potentiometer 29 can be adjusted so that a square wave is provided that is symmetrical in amplitude around zero. This insures that both the positive and negative going ramps have equal slopes.

As the output of integrator 11 is connected to the output terminal 32 through a resistor divider and a potentiometer network, the value of these components are chosen to provide the desired peak to peak current at the output terminal. Potentiometer 35 can be adjusted to insure that the output current is symmetrical around zero.

It can thus be seen that the present invention provides an improved generator for producing a signal having a triangular waveform. Furthermore, the circuit herein disclosed provides a triangular wave having symmetrical slopes and requires a minimum number of parts.

Obviously many modifications and variations of the present invention are possible in the light of the above teachings. It is therefore to be understood, that within the scope of the appended claims, the invention may be practiced otherwise than as specifically described.

What is claimed is:
1. A triangular waveform generator comprising:
   (a) a trigger circuit for generating a square wave signal having positive and negative voltage outputs, said trigger circuit having an input and an output,
   (b) an integrator having an input and an output for integrating said square wave signal into negative and positive ramp function output signals, the output of said integrator being connected directly to the input of said trigger circuit, and
   (c) feedback means connecting the output of said trigger circuit and the input of said integrator.

2. A triangular waveform generator as set forth in claim 1 wherein said trigger circuit is a Schmitt trigger and adjusting means are provided for shifting said square wave signal to be symmetrical in amplitude around zero.

3. A triangular waveform generator as set forth in claim 1 wherein said trigger circuit is a Schmitt trigger and adjusting means are provided for shifting the output current of said integrator to be symmetrical around zero.

References Cited in the file of this patent

UNITED STATES PATENTS

| | | |
|---|---|---|
| 2,726,331 | Robinson | Dec. 6, 1955 |
| 2,748,272 | Schrock | May 29, 1956 |
| 2,980,866 | Naines | Apr. 18, 1961 |

OTHER REFERENCES

Time Bases, Puckle (John Wiley & Sons, Inc., New York, 2nd Edition, 1951), pages 81–83.